United States Patent
Young

(10) Patent No.: US 6,988,166 B1
(45) Date of Patent: Jan. 17, 2006

(54) METHOD FOR SNOOPING RAID 1 READ TRANSACTIONS BY A STORAGE DEVICE

(75) Inventor: B. Arlen Young, Palo Alto, CA (US)

(73) Assignee: Adaptec, Inc., Milpitas, CA (US)

( * ) Notice: Subject to any disclaimer, the term of this patent is extended or adjusted under 35 U.S.C. 154(b) by 309 days.

(21) Appl. No.: 10/210,594

(22) Filed: Jul. 31, 2002

(51) Int. Cl.
*G06F 12/00* (2006.01)

(52) U.S. Cl. .................. 711/114; 711/162; 711/146

(58) Field of Classification Search ............... 711/112, 711/114, 146, 154, 137, 111, 113, 101, 162; 710/313, 314, 315, 100, 119, 120, 107; 712/205, 712/207, 240, 233
See application file for complete search history.

(56) References Cited

U.S. PATENT DOCUMENTS

| | | | |
|---|---|---|---|
| 6,105,118 A * | 8/2000 | Maddalozzo et al. ....... 711/167 |
| 6,721,845 B1 * | 4/2004 | Clegg et al. ................ 711/114 |
| 6,763,433 B1 * | 7/2004 | Arimilli et al. ............. 711/146 |
| 6,772,189 B1 * | 8/2004 | Asselin ....................... 718/100 |
| 2003/0014520 A1 * | 1/2003 | Rinaldis et al. ............. 709/225 |

OTHER PUBLICATIONS

Sahai, "Performance Aspects of RAID Architectures", © 1997 IEEE, p. 321-327.*

* cited by examiner

*Primary Examiner*—Brian R. Peugh
(74) *Attorney, Agent, or Firm*—Gunnison, McKay & Hodgson, L.L.P.; Forrest Gunnison

(57) ABSTRACT

To implement a RAID 1 transaction, an initiator sends a single command, i.e., either a single read command, or a single write command, over a common I/O bus to a primary target device. A mirror target device snoops the common I/O bus and upon detecting the single command directed to the primary target device, effectively performs in the same manner as if the command had been directed to the mirror target device. Hence, a single command is used to effectuate a mirrored transaction.

14 Claims, 6 Drawing Sheets

METHOD FOR SNOOPING RAID 1 READ TRANSACTIONS BY A STORAGE DEVICE

BACKGROUND OF THE INVENTION

1. Description of Related Art

The present invention relates generally to redundant data storage, and more particularly, to implementing RAID 1 mirroring by storage devices sharing a common bus.

2. Description of Related Art

Host adapter integrated circuits were widely used for interfacing two I/O buses such as a host computer I/O bus and a SCSI bus. Frequently, a host adapter integrated circuit was used in a data storage system that implemented redundant data storage.

Redundancy is increasingly becoming a requirement for data storage systems. If one data storage device fails, the data on the failed data storage device preferably can be reconstituted or reconstructed using data content on other data storage devices in the data storage system.

The simplest scheme for providing data redundancy was mirroring of data storage devices where data written to one data storage device was also written on another data storage device. This mirroring scheme was also referred to as RAID 1. With mirroring, if one data storage device failed, the data content was drive prices have fallen, the mirroring scheme has increased in popularity.

One implementation of data mirroring used a software manager to identify two data storage devices, such as SCSI disk drives, and to issue write commands for the same data to the two data storage devices. The software manager generated two data write commands, which in the simplest case differed only in the target data storage device specified. This mirroring scheme was implemented only at the software manager level. The data storage devices, host adapters and the corresponding management software required no modifications to support this data mirroring technique. To these devices, the data mirroring was not evident because the devices were simply processing routine write commands.

While this data mirroring technique is easily implemented, the technique generates additional traffic on the I/O bus between the device executing the software manager and the host adapter for example. Frequently, this I/O bus is the busiest bus in the data storage system and so additional traffic on this I/O bus further exacerbates any I/O bottlenecks associated with this I/O bus. Also, since two commands are generated for each write, the memory in the system executing the software manager must have the capability to store the two commands as well as any memory structures used in monitoring the processing of the two commands. There is a similar requirement for reading mirrored data. Also, in addition to executing the software manager, the system processor must execute instructions to build and monitor the execution of the duplicate commands required for the mirrored transaction. Thus, while data redundancy is desirable, it adversely affects system performance in several different respects, and in some cases may prevent the implementation of mirrored transactions.

SUMMARY OF THE INVENTION

A target device snooping method, according to one embodiment of the present invention, minimizes the utilization problems of a host system and an initiator associated with prior art RAID 1 mirroring, while providing the same functionality and robustness. In one embodiment, an initiator and a pair of RAID 1 storage devices on are a common input/output(I/O) bus. One device in the pair of RAID 1 storages devices is designated a primary target device and the other device in the pair is designated a mirror target device.

To implement a RAID 1 transaction, the initiator sends a single command, i.e., either a single read command, or a single write command, over the common I/O bus to the primary target device. The mirror target device snoops the common I/O bus and upon detecting the single command to the primary target device, effectively performs in the same manner as if the command had been directed to the mirror target device.

Hence, for a RAID 1 command, e.g., a mirrored transaction, a single hardware I/O control block is generated by a host software driver that includes a mirror manager and an initiator manager, and is transferred over a host I/O bus to the initiator, which in one embodiment is a SCSI host adapter integrated circuit. The host system stores only a single hardware I/O control block for the mirrored transaction.

Only one command block is generated by the mirror manager and delivered to the initiator manager for each RAID 1 transaction. This saves host CPU execution time and memory relative to the prior art RAID 1 methods that generated two command blocks for each mirrored transaction.

Also, only one hardware I/O control block is generated by the initiator manager and delivered to the initiator. Hence, host bus bandwidth also is saved by not having to transfer two hardware I/O control blocks for each mirrored transaction.

In addition, initiator sequencer execution time and initiator array memory space are saved by not having to generate a second hardware I/O control block for the mirrored transaction. Since only one target device in a pair of mirrored target storage devices is selected by the initiator, the utilization of the common I/O bus is enhanced relative to prior art RAID 1 methods. In addition, the initiator generates only a single interrupt to the host system to indicate completion of the RAID 1 transaction. Consequently, this embodiment of the target snooping method enhances multiple aspects of system performance relative to other mirroring processes.

In one embodiment of the methods of this invention, a second device snoops on an input/output (I/O) bus for a read command directed to a first device on the I/O bus. The second device initiates execution of the read command by starting to retrieve data specified in the read command that is stored on the second device upon detecting the read command.

The second device transfers the data over the I/O bus only if the second device has the data ready and can access the I/O bus before the first device responds to the read command. In one embodiment, upon the first device detecting the transferring the data over the I/O bus by the second device, the first device aborts execution of the read command by the first device. In another embodiment, the initiator aborts execution of the read command by the first device following the transferring the data over the I/O bus by the second device.

In yet another embodiment of the methods of this invention, a first device on an I/O bus is designated as a primary target device for a RAID 1 read operation. A second device on the I/O bus is designated as a mirror target device for the RAID 1 read operation. The mirror target device snoops the I/O bus to detect a read command directed to the primary target device.

The mirror target device initiates execution of the read command by starting to retrieve data specified in the read command upon detecting the read command directed to the primary target device. The mirror target device transfers the data over the I/O bus only if the mirror target device has the data ready and can access the I/O bus before the primary target device responds to the read command.

In still yet another embodiment of the methods of this invention, an initiator issues a single read command on a SCSI bus to implement a RAID 1 read transaction. The initiator issues a single interrupt to a host system to indicate completion of the RAID 1 read transaction.

The issuing of the single read command by the initiator includes issuing the single read command to a primary target device in a pair of target devices on the SCSI bus. A mirror target device in the pair of target devices snoops the SCSI bus to detect the single read command, and responds to the single read command as described above.

In a write transaction, a second device snoops on an input/output (I/O) bus for a write command directed to a first device on the I/O bus. The second device copies data specified in the write command from the I/O bus to the second device upon detection of the write command. The second device issues a write command complete notification following completion of the copying.

In yet another embodiment of the methods of this invention, a first device on an I/O bus is designated as a primary target device for a RAID 1 write operation. A second device on the I/O bus is designated as a mirror target device for the RAID 1 write operation. The mirror target device snoops the I/O bus to detect a write command directed to the primary target device.

The mirror target device initiates execution of the write command by copying data specified in the write command, upon detecting the write command directed to the primary target device, from the I/O bus and storing the data on the mirror target device. The mirror target device issues a write command complete notification following completion of the copying.

In still yet another embodiment of the methods of this invention, an initiator issues a single write command on a SCSI bus to implement a RAID 1 write transaction. The initiator issues a single interrupt to a host system to indicate completion of the RAID 1 write transaction.

The issuing of the single write command by the initiator includes issuing the single write command to a primary target device in a pair of target devices on the SCSI bus. A mirror target device in the pair of target devices snoops the SCSI bus to detect the single write command, and responds to the single write command as described above.

BRIEF DESCRIPTION OF THE DRAWINGS

In the drawings and the following detailed description, elements with the same reference numeral are the same or equivalent elements. Also, the first digit of a reference numeral is the number of the drawing in which the element having that reference numeral first appeared.

DETAILED DESCRIPTION

Figure 1A:
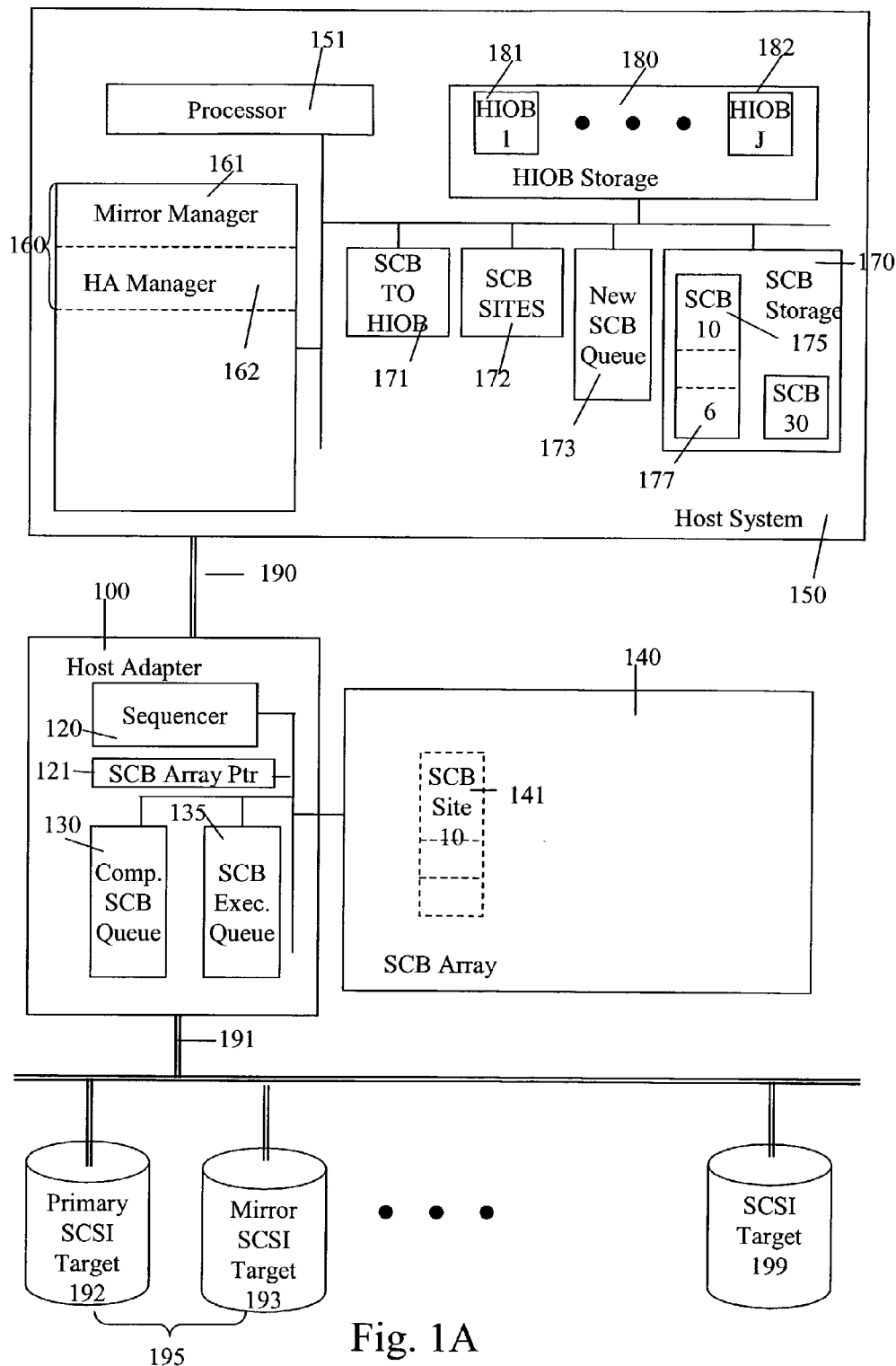
FIG. 1A is block diagram of a system that includes a snooping mirror target device in a pair of RAID 1 target devices with a single hardware I/O command block for a RAID 1 transaction stored in the host system memory, according to one embodiment of the present invention.

A SCSI target device snooping method, according to one embodiment of the present invention, minimizes the utilization problems of host system 150 (FIGS. 1A and 1B) and host adapter integrated circuit 100 associated with prior art mirroring, while providing the same functionality and robustness. For a RAID 1 command, e.g., a mirrored transaction, a single hardware I/O control block 175 is generated by a host software driver 160 that includes a mirror manager 161 and a host adapter (HA) manager 162, and is transferred over host I/O bus 190 to host adapter integrated circuit 100. Thus, host system 150 must store only a single hardware I/O control block for the mirrored transaction.

In executing hardware I/O control block 175, host adapter integrated circuit 100 issues a single command on SCSI bus 191 to a primary target device 192 in a RAID 1 pair 195. As explained more completely below, a mirror target device 193 in RAID 1 195 pair snoops SCSI bus 191 for commands directed to primary target device 192. Upon detecting a command to primary target device 192, mirror target device 193 effectively performs in the same manner as if the command had been directed to mirror target device 193.

Only one command block is generated by mirror manager 161, e.g., the RAID manager, and delivered to host adapter manager 162 for each RAID 1 transaction. This saves host CPU execution time and memory relative to the prior art RAID 1 methods that generated two command blocks for each mirrored transaction.

Also, only one hardware I/O control block 175 is generated by host adapter manager 162 and delivered to host adapter integrated circuit 100. Hence, host bus bandwidth also is saved by not having to transfer two hardware I/O control blocks for each mirrored transaction.

In addition, host adapter sequencer execution time and host adapter array memory space are saved by not having to generate a second hardware I/O control block for the mirrored transaction. As explained more completely below, only one target device in pair of mirrored target devices 195 is selected by host adapter integrated circuit 100, the initiator in this example, and not both target devices 192 and 193 as in the prior art. Consequently, this embodiment of the target snooping method enhances multiple aspects of system performance relative to other mirroring processes.

Prior to considering the target snooping method in more detail, it is noted that snooping on a SCSI bus has advanced over the years. Bus snooping was very limited in the original SCSI specification. SCSI target devices, sometimes referred to herein as targets, only snooped the SCSI bus to check if the SCSI bus was busy before attempting to arbitrate for a reselection, and again to check the addresses of the arbitors to establish priority.

With the introduction of Quick Arbitration Selection (QAS), targets began snooping SCSI bus phase Message In of other targets, looking for the message from a target and the acknowledgement signal ACK from the initiator that allowed the targets to start arbitrating for the SCSI bus. The concept of arbitration fairness was also introduced, requiring each target to snoop the arbitration and selection phases to identify all targets that were attempting to gain access to the bus. After having gained access to the bus, each target, before arbitrating again, was required to wait until all other targets attempting to gain access to the bus had won arbitration.

SCSI expanders are devices that are inserted in the SCSI bus between initiators and targets. SCSI expanders must snoop the Message phases on the SCSI bus, to understand the various data transfer options negotiated between an initiator and target. A SCSI expander must also snoop the Command and Data phases on the SCSI bus to respond to an initiator trying to communicate with the SCSI expander.

Thus, SCSI bus snooping has continually increased in scope, as additional protocols are defined in the SCSI specification. This embodiment of the invention uses this snooping concept to effectively request a mirrored operation data from both target devices 192, 193 of mirrored pair 195 using only a single command block transferred across SCSI bus 191.

The configuration of hardware I/O control block 175 is dependent upon the embodiment of this invention that is utilized. In one embodiment, a list of pairs of target devices is maintained by and is available to host software driver 160. This list of pairs of target devices is supplied to host adapter integrated circuit. In this embodiment, hardware I/O control block 175 is the same as in the prior art and for a mirrored transaction, only the primary target device in a pair of target devices is specified in hardware I/O control block 175. This configuration requires host adapter 100 to check against the list at least after completion of each write command to determine whether the write is associated with a mirrored transaction.

In another embodiment, the list is maintained as in the previous embodiment, but hardware I/O control block 175 includes a mirror field that is set to false by default. When a transaction is mirrored, the mirror field is set to true. In this embodiment, with the exception of the mirror field, hardware I/O control block 175 is the same in the prior art and for a mirrored transaction, only the primary target device in a pair of target devices is specified in hardware I/O control block 175. This configuration requires a check of the mirror field and if it is set, using the list to determine the mirror drive when it is necessary for a mirrored transaction.

In yet another embodiment, a list of mirrored pairs is not passed to the host adapter, instead for a mirrored transaction, both the ID for primary target device 192 and the ID for mirror target device 193 are included in hardware I/O control block 175. The ID for mirror target device 193 is included in a mirrored target field 177 of hardware I/O control block 175.

If mirrored target field includes a valid entry, host adapter 100 knows that the transaction is a mirrored transaction and the disk drive pair associated with the mirrored transaction is fully specified in block 175. Conversely, if the mirrored target field contains a null identification, host adapter 100 expects only the primary drive to respond and knows that the transaction is not mirrored.

Thus, in one embodiment, for a write transaction, hardware I/O control block 175, sometimes called a sequencer control block (SCB) 175, contains all the original information used to specify a transfer of data from host system 150 to a primary target device 193 for a RAID pair 195 in a plurality of target devices 192, 193, 199 on I/O bus 191. The original information in SCB 175 is not affected by this invention. In addition, if the data is for a mirrored transaction, hardware I/O control block 175, in one embodiment, identifies a mirror target device 193 in RAID pair 195 on which the data is to be mirrored in the mirrored target field.

Similarly, for a read transaction, hardware I/O control block 175 contains all the original information used to specify a transfer of data from a first target device in a plurality of target devices 192, 193, 199 on I/O bus 191 to host system 150, and the original information is not affected by this invention. In addition, if the data is mirrored, hardware I/O control block 175, in one embodiment, identifies a mirror target device on which the data is mirrored in the mirrored target field.

Hence, host adapter 100, i.e., initiator 100, recognizes a SCB that requests a mirrored transaction using a mirrored pair of target device and responds appropriately to information from the mirrored pair, as described more completely below. If the mirrored target field contains a null identification, host adapter 100 expects only the specified device to respond.

For either a read or a write, after transferring single hardware I/O control block 175 from a memory of host system 150 to a memory of host adapter integrated circuit 100, e.g., SCB array 140, a sequencer 120 in host adapter integrated circuit 100 determines when to execute hardware I/O control block 175. In this example, host adapter integrated circuit 100 can determine whether hardware I/O control block 175 is for a mirrored transaction by determining whether the mirrored target field contains a valid entry.

Independent of whether the transaction is mirrored, host adapter integrated circuit 100 selects only one target device, which in this example is primary target device 192, and sends a command to that target device. Hence, the operations up to this point on the various buses for a mirrored transaction are the same as those for an un-mirrored transaction. Consequently, the mirrored transactions do not require any additional bus resources.

Mirror target device 193 knows that it is a mirror device for primary target device 192. Mirror target device 193 snoops SCSI bus 191 for all activity associated with primary target device 192. When mirror target device 193 detects a command directed to device 192, device 193 responds as if the command were directed to device 193 and acts accordingly depending upon whether the command is a write command or a read command.

When the execution of the command is complete, i.e., either the data has been mirrored on both drives of pair 195, or the data has been retrieved from one of pair 195, host adapter integrated circuit 100 provides a single completion notification to host system 150, e.g., issues a single interrupt to host system 150. Host system 150 recognizes whether the completion notification is for a mirrored or non-mirrored transaction and processes the completion notification appropriately. If a target device fails during data retrieval, driver 160 accesses the other target device in the mirrored pair of target devices to retrieve the data.

Hence, only a single hardware I/O control block is built in host system 150 for both mirrored and non-mirrored read and write transactions. Only a single hardware I/O control block is moved from host system 150 to host adapter 100 for both mirrored and non-mirrored transactions.

Only a single target device is selected by host adapter 100 and only a single command is driven on SCSI bus 191 for both mirrored and non-mirrored read and write transactions. Only a single completion notice is provided to host system 150 for both mirrored and non-mirrored read and write transactions.

Hence, this embodiment of the invention minimizes traffic over I/O bus 190 for mirrored transactions. This invention enhances memory utilization in host system 150, because only a single hardware I/O control block is required for mirrored transactions and not two as previously required. This invention also enhances the system processor utilization in system 150 because at most one interrupt is required to indicate completion of a mirrored transaction, and only the one hardware I/O control block is built by host system 150.

Herein, when it is indicated that host system 150, host adapter 100 and/or a target device takes an action, those of skill in the art will understand that either an instruction or instructions are executed by a processor that in turn results in the action, or alternatively, hardware performs operations that result in the action. The particular technique used to implement the action is not essential to this invention.

In one embodiment of this invention in a build HIOB operation 210 (FIG. 2), a mirror manager 161 in driver 160 builds a new host I/O block (HIOB), e.g., one host I/O block 181 in a plurality of host I/O blocks 181 to 182, in a memory, which is identified as HIOB storage 180, in response to a request to store data or retrieve data. In this embodiment, mirror manager 161 sets a mirrored target field to a null value.

Mirror manager 161 determines in mirror check operation 211 whether the request is for a mirrored transaction. If the transaction is for mirrored data, processing transfers to update mirror data operation 212 and otherwise to load HIOB 213.

In one embodiment, update mirror data operation 212 loads the mirrored target field with an identification number of a target device on which the mirrored data is to be written, or from which the mirrored data is to be read. In this embodiment, update mirror operation 212 also transfers to load HIOB operation 213. In another embodiment, a table of RAID 1 pairs is used, and the HIOB includes a mirrored flag that is set to signal to host adapter manager 162 to access the table and determine the mirror device that corresponds to the primary device specified in the HIOB and otherwise the mirrored flag is cleared.

In one embodiment of load HIOB operation 213, a pointer to new HIOB 181 is placed in a new HIOB queue (not shown) for host adapter manager 162. Load HIOB operation completes the operation of mirror manager 161 for new HIOB 181.

In this embodiment, host adapter manager 162 checks whether there is a new HIOB in the new HIOB queue in new HIOB check operation 220. If new HIOB 181 is detected, check operation 220 transfers to allocate site operation 221, and otherwise returns to check operation 220.

Figure 2:
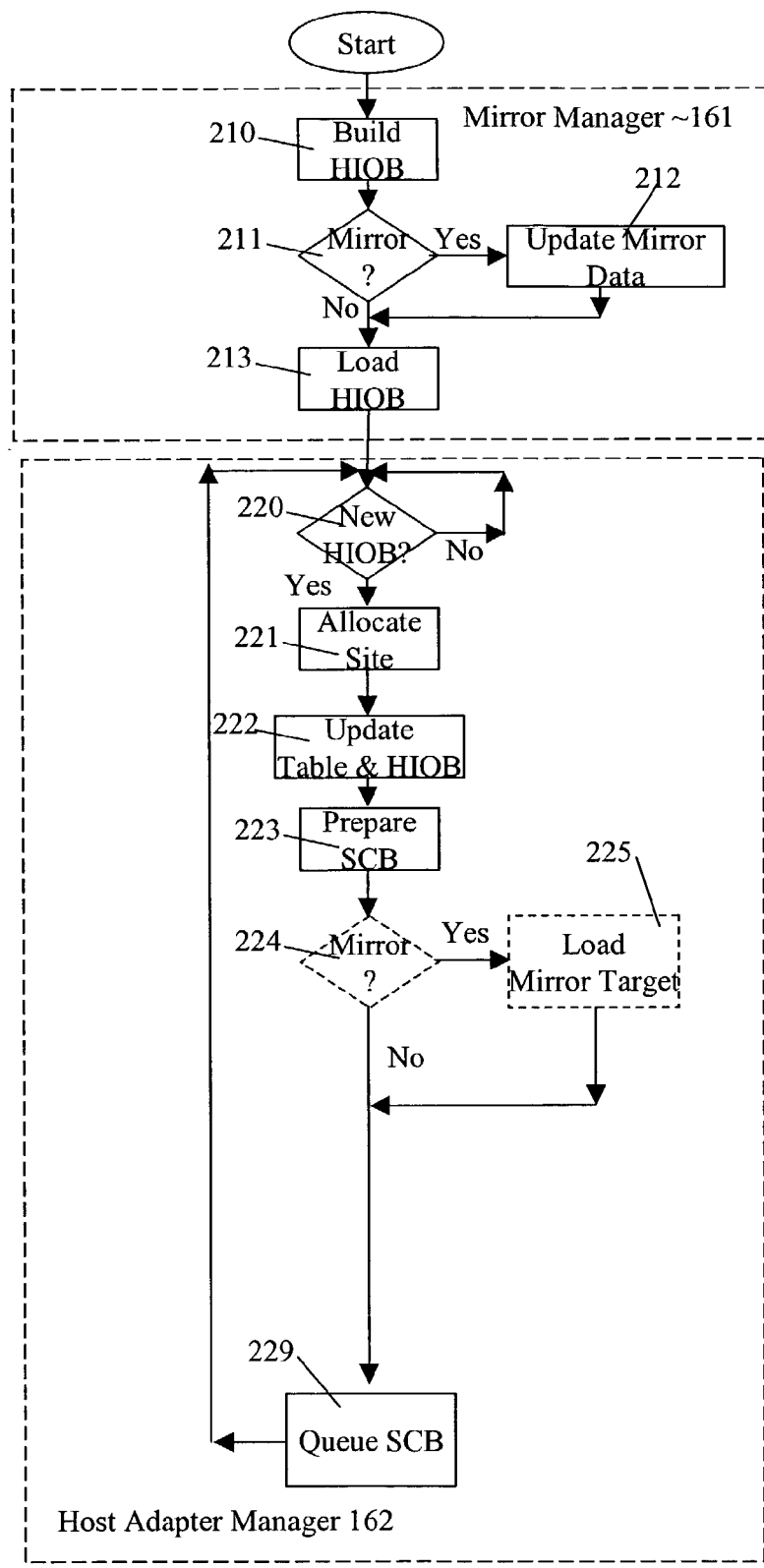
FIG. 2 is a process flow diagram for one embodiment of the operations of a mirror manager and a host adapter manager in building the single hardware I/O command block, according to one embodiment of the present invention.

The serial sequence of operations in FIG. 2 is illustrative only and is not intended to limit the invention to this particular embodiment. For example, host adapter manager 162 need not repeatedly poll in new HIOB check operation 220. An event may occur that notifies host adapter manager 162 that a new HIOB is available, and host adapter manager 162 responds to this event. Hence, check operation 220 is intended only to show that host adapter manager 162 does not process a new HIOB until host adapter manager 162 determines that a new HIOB is available by whatever means are used in a particular application of this embodiment of the present invention.

Also, since FIG. 2 illustrates operations by different entities, these operations may occur in parallel. Finally, the sequence of operations also is only illustrative. Those of skill in the art will be able to implement various sequences of operations that achieve the advantages of this invention in view of this disclosure.

In response to detecting new HIOB 181, host adapter manager 162 accesses SCB sites queue 172, in allocate site operation 221, to ascertain an available storage site in SCB array 140. SCB sites queue 172 is a queue of available sites in SCB array 140. Host adapter manager 162 removes an available storage site, e.g., SCB storage site 141, from SCB sites queue 172 and transfers processing to update table and HIOB operation 222. In this embodiment, the number of the storage site in SCB array 140, e.g., 10, is used as a SCB identification number, which is also a pointer to the storage site within SCB array 140.

In update table and HIOB operation 222, host adapter manager 162 updates SCB to HIOB table 171. Specifically, host adapter manager 162 maintains table 171, which is a table of HIOB addresses as a function of SCB identification numbers. After a SCB identification number has been assigned to a SCB and entered in a field of the SCB, the memory address for the corresponding HIOB, e.g., HIOB 181, is entered in table 171 at the element labeled by the SCB identification number.

Hence, in this example, in update table and HIOB operation 222, host adapter manager 162 writes the address of HIOB 181 in HIOB storage 180 in element ten of SCB to HIOB table 171. In addition, operation 222 enters the SCB identification number of the SCB in HIOB 181. Following completion of update table and HIOB operation 222, processing by host adapter manager 162 transfers to prepare SCB operation 223.

In prepare SCB operation 223, host adapter manager 162 uses the information in HIOB 181 to build SCB 175 in SCB storage 170. The SCB identification number, 10, is loaded in SCB 175, and the other information in SCB 175 is generated as in the prior art. Prepare SCB operation 223 transfers processing to mirror check operation 224.

In mirror check operation 224, host adapter manager 162 reads the mirrored target field in HIOB 181. If the mirrored target field contains other than a null value, check operation 224 transfers to load mirror target operation 225 and otherwise to queue SCB operation 229.

Upon entry to load mirror target operation 225, host adapter manager 162 loads mirrored target field 177 of SCB 175 with a target identification, which in this example is 6. If HIOB 181 includes the mirrored target identification, the mirrored target field in HIOB 181 is read to obtain the target identification and then loaded in field 177. In another embodiment, a default target device is used for mirroring, and host adapter manager 162 loads the target identification of the default target device in field 177. In still yet another embodiment, a table of RAID 1 pairs is used to determine the ID of the device that is loaded in field 177. Operation 225 transfers processing to queue SCB operation 229.

In FIG. 2, operations 224 and 225 are illustrated with a dotted line. This is intended to indicate that in other embodiments, as described above, that do not include field 177 in the SCB, these operations are not utilized.

In queue SCB operation 229, host adapter manager 162 loads an address to SCB 175 in new SCB queue 173. In one embodiment, the address is a pointer to the location of SCB 175 within SCB storage 170. Operation 229 completes the operations of host adapter manager 162 for SCB 175.

Several advantages of the present invention are apparent at this time. First, a common SCB structure is used for both mirrored and non-mirrored read and write transactions. For mirrored read and write transactions, only a single SCB and a single SCB pointer are stored in the memory of host system 150. Since host adapter manager 162 builds only a single SCB for the mirrored read and write transactions instead of two SCBs, the utilization of processor 151 is nearly 50% less than the prior art approach that built two SCBs for each mirrored transaction. In addition, the memory used to build and store the SCB is also nearly 50% less than the prior art.

Hence, prior art host systems that could not support mirroring due to memory or processor utilization limitations can now support mirrored transactions. The resources required on the host system by this embodiment of the present invention are effectively the same as were required previously for non-mirrored operations.

Sequencer 120 of host adapter 100 executes firmware that determines when host adapter manager 162 has added a new SCB to new SCB queue 173. In one embodiment, sequencer 120 configures a DMA engine in host adapter 100 to transfer the pointer in queue 173 to host adapter 100 and then to transfer the SCB addressed by the pointer. Hence, for both mirrored and non-mirrored read and write transactions, only a single pointer and a single SCB are transferred over I/O bus 190.

The particular method used to transfer the SCBs of this embodiment of the invention from host memory 150 to SCB array 140 is not essential to the invention. However, one way suitable for use in this invention is presented in U.S. Pat. No. 6,006,292, entitled "Method of Managing Hardware Control Blocks Utilizing Endless Queue Maintained to Never be Empty and Containing Tail Pointer Only Accessible by Process Executing on System Processor," of B. Arlen Young issued on Dec. 21, 1999, and incorporated herein by reference in its entirety.

Figure 1B:
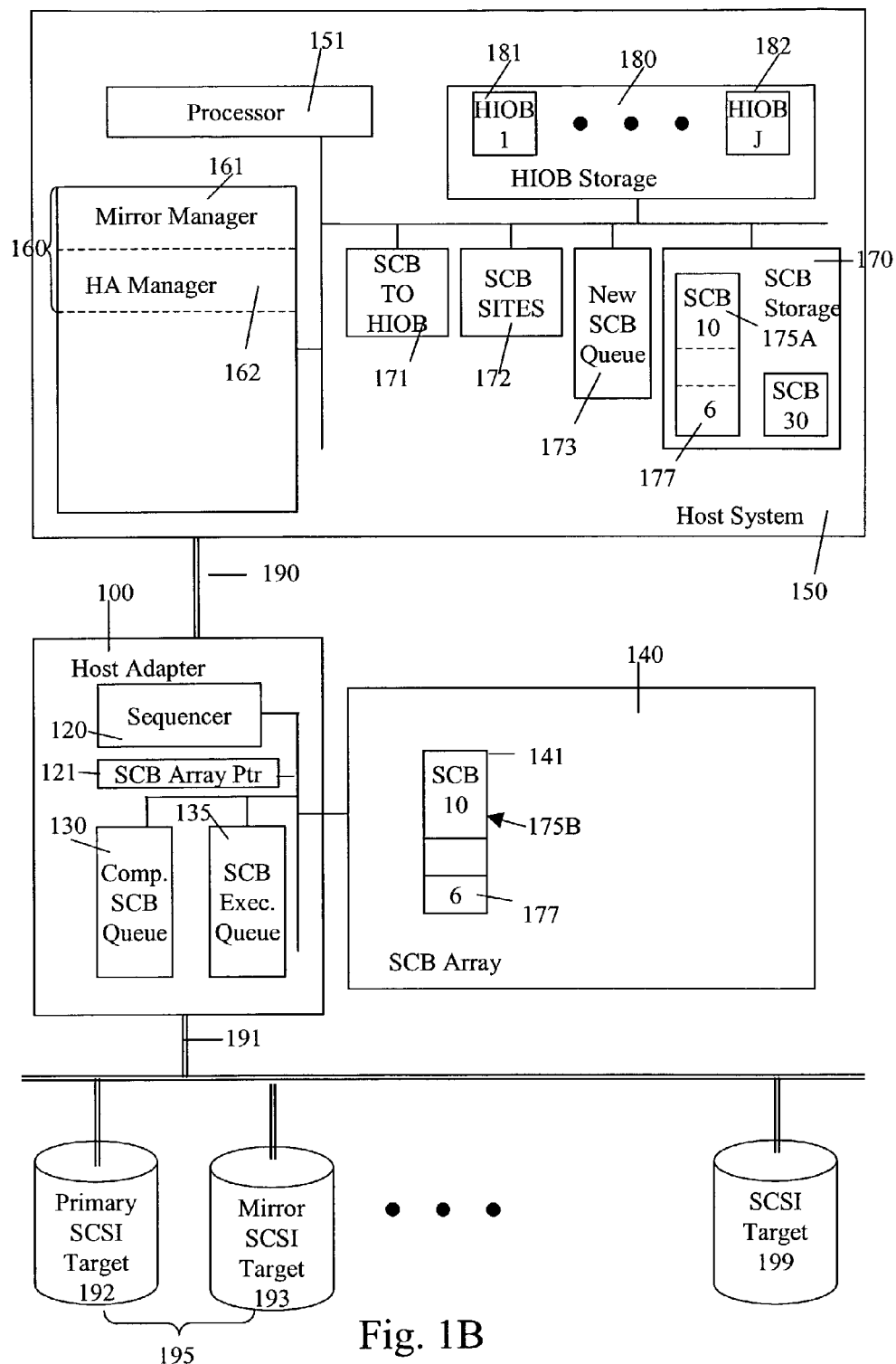
FIG. 1B is block diagram of a system that includes the snooping mirror target device in the pair of RAID 1 target devices with the single hardware I/O command block for a RAID 1 transaction stored in memory of a SCSI host adapter integrated circuit, according to one embodiment of the present invention.

Hence, when sequencer 120 determines that a new SCB is available, e.g., SCB 175 (FIG. 1B), new SCB check operation 301 (FIG. 3A) transfers processing to load SCB operation 302. In load SCB operation 302, host adapter 100 transfers SCB 175 from SCB storage 170 to storage site 141 in SCB array 140 as SCB 175B (FIG. 1B). The SCB identification number, i.e., 10, is loaded into SCB array pointer register 121 so that pointer register 121 addresses storage location 141. Load SCB operation 302 transfers processing to update execution queue operation 303.

Upon entry of operation 303, sequencer 120 appends the SCB identification numbers of new SCB 175B to SCB execution queue 135. SCB 175B in this embodiment of the present invention is executed in the same manner as in the prior art. However, for a mirrored write transaction, the data is transferred only once from the host system memory, and not twice as in the prior art. For a mirrored read, the data is transferred once to the host system memory.

Specifically, in one embodiment, execution started check operation 310 (FIG. 3B) determines whether a SCB from execution queue 135 started execution. When a SCB starts execution, check operation 310 transfers processing to mirrored read check operation 311.

If field 177 in the executing SCB contains a valid target ID, and the SCB contains a read command, processing transfers from check operation 311 to execution complete operation 312 and otherwise to mirrored write check operation 316. If field 177 in the executing SCB contains a valid target ID, and the SCB contains a write command, processing transfers from check operation 316 to pair execution complete operation 317 and otherwise to execution complete check operation 318.

If processing reaches check operation 318, the executing SCB is for a non-mirrored transaction. The execution for a non-mirrored transaction is the same as in the prior art and so is not considered further.

Prior to considering the operations by host adapter integrated circuit 100 further, as indicated, a mirrored transaction involves, in this embodiment, two disk drives 192 and 193 of pair 195 on the same SCSI bus 191. One disk drive 193 is defined as the mirror of the other disk drive 192. Hence, each RAID 1 primary drive, e.g., drive 192, has its own dedicated mirror drive, e.g., drive 193, and the pairing of such drives is understood by host adapter 100 by one of the methods indicated above. In the example of FIGS. 1A and 1B, SCB 175 includes the identification for the mirrored drive. However, as described above, the pairs could be defined in a table residing in host adapter 100 and configured by host adapter manager 162 during initialization.

Disk drives are used herein as an example of a storage device on an I/O bus and are not intended to limit the invention to either disk drives or a SCSI bus. In view of this disclosure, those of skill in the art can implement the embodiments of this invention on any bus architecture that supports RAID 1 operations and with any storage devices that support RAID 1 operations on that bus architecture so long as at least one of the storage devices can snoop the I/O bus, and that storage device is the RAID 1 mirror device.

Figure 4:
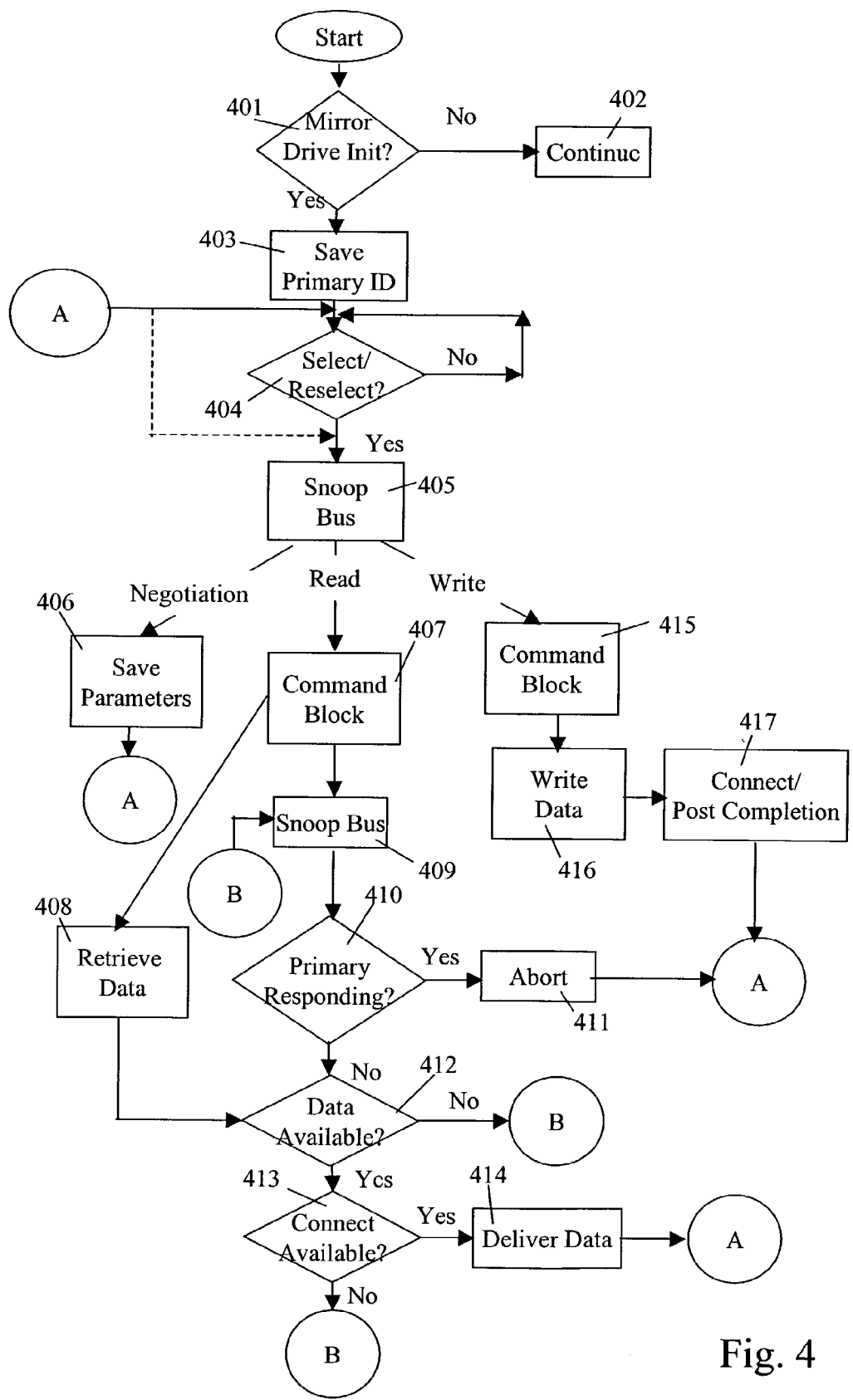
FIG. 4 is a processing flow diagram for one embodiment of the snooping target device, according to one embodiment of the present invention.

Mirror SCSI target device 193, sometimes referred to as mirror drive 193, understands that it is a mirror to primary SCSI target device 192, sometimes referred to as primary drive 192. In one embodiment, mirror drive 193 gains this understanding from a command, Mode Select page, or other communication from an initiator such as host adapter 100. Hence, as illustrated in FIG. 4, a SCSI target device in mirror drive initialization check operation 401 determines whether the command is a mirror device initialization command. If the command is not a mirror device initialization command, check operation 401 transfers to continue operation 402 and the SCSI target device operates as a prior art device.

If the command is a mirror drive initialization command, check operation 401 transfers to save primary ID operation 403. In save primary ID operation 403, the mirror device saves the SCSI identification on the common SCSI bus of the primary drive.

Hence, in the example of FIGS. 1A and 1B, when SCSI target device 193 receives a mirror device initialization command from host adapter integrated circuit 100, SCSI target device 193 saves the identification on SCSI bus 191 of primary SCSI target 192 in operation 403. Operation 403 transfers to select/reselect check operation 404.

In select/reselect check operation 404, mirror drive 193 snoops all activity involving primary drive 192 on common SCSI bus 191. Mirror drive 193 ignores all activity for all of other devices on SCSI bus 191. Whenever sister primary drive 192 is selected by an initiator, e.g., host adapter 100, or reselects an initiator, mirror drive 193 monitors all activity on SCSI bus 191. Thus, when a select operation or a reselect operation is detected in check operation 404, processing in mirror drive 193 transfers to snoop bus operation 405 in which all activity on SCSI bus 191 is monitored.

When in snoop bus operation 405 a negotiation is detected, processing transfers to save parameters operation 406. In save parameters operation 406, drive 193 monitors the negotiation of data transfer modes, rates, offsets, and other options between a SCSI initiator and primary drive 192. When the negotiation is completed, mirror drive 193 remembers, i.e., saves, the agreed-upon options for that initiator. Following a negotiation, the action taken by primary drive 192, and consequently, mirror drive 193 depends upon the SCSI protocol. Hence, operation 406 returns to the operation consistent with the SCSI protocol being used.

Mirrored Read

When host adapter 100 selects primary disk drive 192 and transfers a "read" command to drive 192, processing transfers from snoop bus operation 405 to command block operation 407 in mirror drive 193. On host adapter 100, mirrored read check operation 311 (FIG. 3B) transfers to execution complete check operation 312.

In response to the read command, primary disk drive 192 either starts transferring data immediately or disconnects from SCSI bus 191 while fetching the data from its media. So far, this operation is substantially identical to a normal non-RAID SCSI "read".

On mirror drive 193, mirror drive 193 snoops the command block delivered to primary drive 192 and begins execution of that command as if the command were directed to mirror drive 193. Specifically, mirror drive 193 initiates retrieve data operation 408 in which mirror drive 193 begins fetching data from its media or its cache, starting with the logical address specified in the command block. While preparing for transferring the data requested from primary drive 192 in operation 408, mirror drive 193 also continues snooping SCSI bus 191 in snoop bus operation 409. Those of skill in the art appreciate that snoop bus operation 405 is equivalent to snoop bus operation 409 and can be implemented using the same software and/or hardware.

Two snoop bus operations are shown in FIG. 4 for clarity only and should not be interpreted as requiring two separate and distinct set of elements to implement the two operations. The sequential flow presented in FIG. 4 also is presented only for clarity and is not intended to limit the invention to such a sequence. Again, those of skill in the art appreciate that some of the operations can be carried out in parallel or in a different sequence if all the necessary information is available for an operation and if resources are available to execute the operation or operations.

While mirror drive 193 is snooping SCSI bus 191 in operation 409, primary responding check operation 410 determines whether primary drive 192 is beginning to transfer the requested data. For a given read command, one disk drive in pair 195 always has data available before the other, although the initiator cannot determine from one command to the next which disk drive that will be. The disk drive with the data available transfers the data to the initiator. Mirror drive 193 determines, by continually snooping SCSI bus 191, if primary drive 192 has started transferring the requested data to initiator 100 and so check operation 410 is true.

For example, if primary drive 192 enters SCSI bus phase Data In without disconnecting after receiving the read command, mirror drive 193 realizes that it has lost the race to provide data to initiator 100 first. Similarly, if primary drive 192 disconnects and then reconnects to initiator 100 with the requested data before mirror drive 193, mirror drive 193 realizes that it is too late. In either case, check operation 410 transfers to abort operation 411.

Thus, if primary drive 192 has begun transferring the requested data, check operation 410 transfers to abort operation 411 and otherwise to data available check operation 412. In abort operation 411, mirror drive 193 aborts the attempt to deliver the data. Abort operation 411 transfers to select/reselect check operation 404 and mirror drive 193 continues snooping SCSI bus 191.

However, if the primary drive has not begun to transfer the data, primary responding check operation 410 transfers to data available check operation 412. If data is available for transfer to the initiator, check operation 412 transfers to connect available check operation 413 and otherwise returns to snoop bus operation 409.

Connect available check operation 413 determines whether mirror drive 193 can gain access to SCSI bus 191. If mirror drive 193 can gain access to SCSI bus 191, check operation 413 transfers to deliver data operation 414 and otherwise returns to snoop bus operation 409.

In deliver data operation 414, mirror drive 193 delivers the data specified in the read command to primary drive 192 to initiator 100. Following completion of the data transfer, operation 414 transfers to select/reselect check operation 404.

Hence, in this embodiment, if in response to a read command to a primary device in a pair of RAID 1 devices on a common SCSI bus, the primary device initiates delivery of the requested data before the mirror device can retrieve the data and gain access to the SCSI bus, the mirror device aborts its attempt to deliver data to the initiator before the primary device. The mirror device then waits for another command to the primary device, and the primary device completes the requested data transfer.

However, if the mirror device has data ready to transfer and connects to the initiator before the primary device, the mirror device continues executing the read command intended for the primary device. The mirror device delivers the requested data to the initiator.

Upon receiving the requested data from one of the drives in pair 195, execution complete check operation 312 (FIG. 3B) transfers to primary drive check operation 313. If primary drive 192 provided the requested data, execution is complete and check operation 313 transfers to update complete queue operation 319.

However, if mirror drive 193 provided the data, the operation of host adapter 100 depends upon whether primary drive 192 is also a snooping drive like mirror drive 193. Hence, check operation 313 transfers to snooping primary check operation 314 if mirror drive 193 provided the data.

If primary drive 192 is a snooping drive, and if primary drive 192 has disconnected from initiator 100, primary drive 192 snoops activity on SCSI bus 191 to see if mirror drive 193 reselects initiator 100 and starts transferring the requested data.

The requested data is typically identified by a tag to distinguish the requested data from other data that might have been requested by other commands. If primary drive 192 observes that its sister drive 193 in mirrored pair 195 is already transferring the requested data, primary drive 192 aborts the command received from initiator 100, and allows mirror drive 193 to complete the command. Thus, primary drive 192 also effectively performs operations equivalent to operations 409 to 414 as necessary. Consequently, for a snooping primary drive, host adapter 100 is not required to take any additional action when mirror drive 193 provides the data and so check operation 314 transfers to update complete queue operation 319.

However, if primary drive 192 is an ordinary drive not capable of RAID 1 snooping, when mirror drive 193 starts transferring the requested data ahead of primary drive 192, host adapter 100 has to abort the command to primary drive 192. Consequently, check operation 314 transfers to abort primary operation 315.

Host adapter 100 can abort the read command to primary drive 192 in any effective way. For example, host adapter 100 can do this by waiting for primary drive 192 to eventually reconnect, asserting Attention, and sending an Abort message to drive 192. As explained above, a field in the SCB, e.g., mirrored target field 177, tells host adapter 100 whether to wait for primary drive 192 to reconnect and be aborted. Following completion of abort primary operation 315, processing transfers to update complete queue operation 319.

In update-complete queue operation 319, sequencer 120 puts a pointer to the just completed SCB in complete SCB queue 130, and an interrupt to host system 150 is generated. In this embodiment, processing is shown transferring from operation 319 to new SCB operation 301. However, this is illustrative only and is not intended to limit the invention to this particular sequence. When sequencer 120 is notified of or detects a particular event, e.g., a new SCB is available or execution of a SCB is completed, sequencer 120 executes appropriate firmware to handle the event.

Figure 3A:
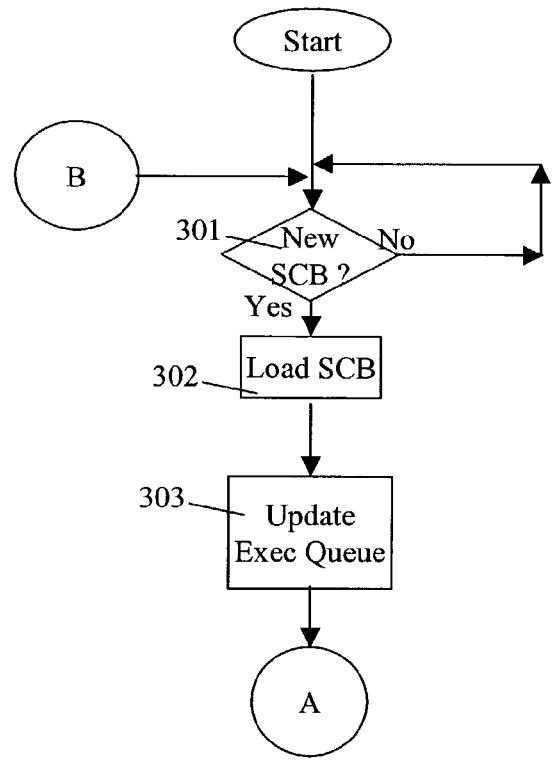
FIGS. 3A and 3B are a process flow diagram for one embodiment of the operations performed by the host adapter, according to one embodiment of the present invention.
Figure 3B:
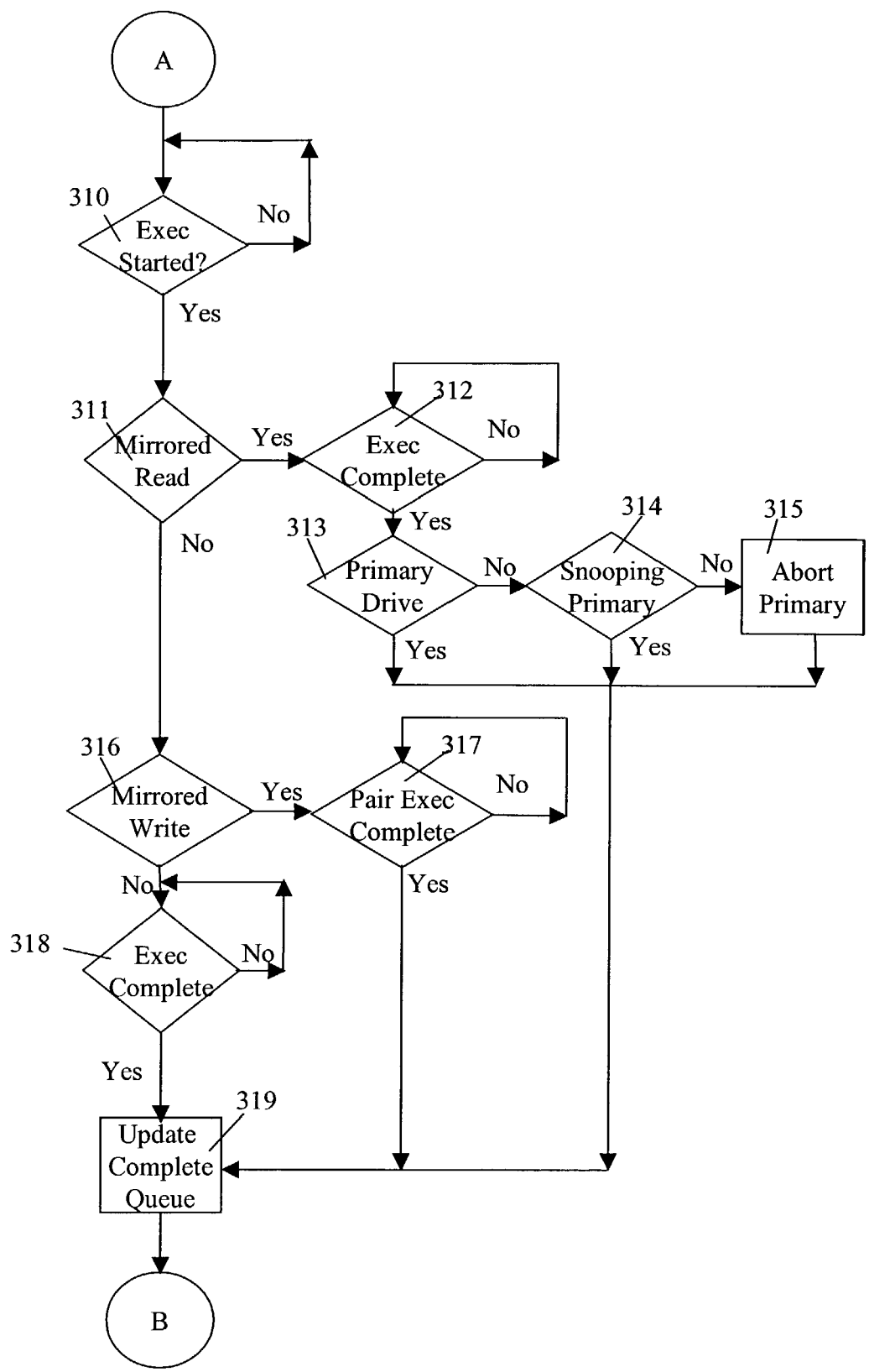

The checks and operations in FIGS. 3A and 3B illustrate one embodiment of the actions that are included within the normal operation of sequencer 120 to provide the enhanced host adapter data mirroring capability of this invention. This embodiment anticipates a system in which the mirrored drives are identical and optimizes for rotational latency.

Hence, when both drives of the mirrored pair are snooping drives, only one of the pair reselects the initiator. Unlike the prior art method, no abort message is required to be sent to the other drive by the initiator. Considerable time is thus saved on the SCSI bus. Only one command block is transferred across the SCSI bus and not two for a mirrored transaction. This also saves considerable time on the SCSI bus. When both drives of the mirrored pair are snooping drives, the SCB can be reported as complete to the host adapter manager as soon as one drive completes execution of the data transfer command. No response is required from the other drive. Only one interrupt is asserted by the host adapter to the host following completion of the RAID 1 "read", even though two disk drives are involved in the execution.

Mirrored Write

As described above, in one embodiment the ID of mirror drive 193 is specified in SCB 175 when SCB includes a write command that is delivered by host adapter manager 162 to host adapter 100. When host adapter 100 selects primary disk drive 192 and transfers a "write" command to drive 192, processing transfers from snoop bus operation 405 to command block operation 415 in mirror drive 193. On host adapter 100, mirrored write check operation 316 transfers to pair execution complete check operation 317.

In response to the write command, primary disk drive 192 starts receiving data. When the data transfer is complete, primary drive 192 sends a completion status to host adapter 100. The completion status is noted by check operation 317.

On mirror drive 193, mirror drive 193 snoops the command block delivered to primary drive 192 and begins execution of that write command as if the command were directed to mirror drive 193. Specifically, mirror drive 193 initiates write data operation 416 in which mirror drive 193 snoops all data on SCSI bus 191 in SCSI bus phase DATA OUT.

Mirror drive 193 copies the data from SCSI bus 191 and writes the data to its media starting with the logical address specified in the command block. Thus, in write data operation 416, mirror drive 193 creates an image of all data transferred to primary drive 192.

While both drives 192, 193 may not be ready to copy data to their media at exactly the same time, it can be expected that the head position of mirror drive 193 is always on the same track as the head position of primary drive 192, i.e., the two heads seek together over the same distance. However, head positions within tracks are expected to be completely uncorrelated. Therefore, in one embodiment, mirror drive 193 includes a data buffer with at least reserve capacity to store enough data equivalent to the data stored in one track of the drive. In any case, following completion of storing the snooped data, operation 416 transfers to connect/post completion operation 417.

In connect/post completion operation 417, mirror drive 193 negotiates for SCSI bus 191 and reselects initiator 100. This is the first time in the RAID 1 write transaction that mirror drive 193 connects to SCSI bus 191. Mirror drive 193 sends a completion status to initiator 100.

When complete check operation 317 receives completion status from both drives in RAID 1 pair 195, check operation 317 transfers to update complete queue operation 319.

Host adapter integrated circuit 100 provides a single completion notification to host system 150 following completion of the RAID 1 write transaction. Host system 150 recognizes whether the completion notification is for a mirrored or non-mirrored transaction and processes the completion notification appropriately. If a target device fails during data retrieval, driver 160 accesses the other target device in the mirrored pair of target devices to retrieve the data.

Hence, only a single hardware I/O control block is built in host system 150 for both mirrored and non-mirrored read and write transactions. Only a single hardware I/O control block is moved from host system 150 to host adapter 100 for both mirrored and non-mirrored transactions. Only a single completion notice is provided to host system 150 for both mirrored and non-mirrored read and write transactions. Hence, this invention minimizes traffic over I/O bus 190 for mirrored transactions. This invention enhances memory utilization in host system 150, because only a single hardware I/O control block is required for mirrored transactions and not two as previously required. This invention also enhances the system processor utilization in system 150 because at most one interrupt is required to indicate completion of a mirrored transaction, and only the one hardware I/O control block.

As described with respect to FIGS. 3A to 3B, host adapter 100 receives only a single SCB for a mirrored transaction and does not generate a second SCB. Similarly, host adapter 100 posts only a single completion notice when the RAID 1 transaction has been completed successfully. Hence, when sequencer 120 notifies host adapter manager 162 that there are completed SCBs in queue 130, host adapter manager 162 uses SCB to HIOB table 171 to determine the HIOB associated with the completed SCB. Host adapter manager 162 reads the SCB identification number or SCB identification numbers stored in the HIOB and returns the numbers to SCB sites queue 172 and reports the HIOB as complete to the original caller.

In view of this disclosure, those of skill in the art can implement host adapter mirroring for a variety of different target devices. For example, the use of SCSI devices is illustrative only and is not intended to limit the invention to such devices.

I claim:

1. A method comprising:
   snooping on an input/output (I/O) bus, by a second I/O device on said I/O bus, for a read command directed to a first I/O device on said I/O bus;
   initiating execution of said read command by said second I/O device by starting to retrieve data specified in said read command that is stored on said second I/O device;
   transferring said data over said I/O bus by said second I/O device only if said second I/O device has said data ready and can access said I/O bus before said first I/O device responds to said read command; and
   aborting, by an initiator, execution of said read command by said first I/O device following said transferring said data over said I/O bus by said second I/O device.

2. A method comprising:
   snooping on an input/output (I/O) bus, by a second I/O device on said I/O bus, for a read command directed to a first I/O device on said I/O bus; and
   initiating execution of said read command by said second I/O device by starting to retrieve data specified in said read command that is stored on said second I/O device, wherein said I/O bus is a SCSI bus.

3. A method comprising:
   snooping on a SCSI bus, by a second device, for a read command directed to a first device on said SCSI bus;
   initiating execution of said read command by said second device by starting to retrieve data specified in said read command; and
   transferring said data over said SCSI bus by said second device only if said second device has said data ready and can access said SCSI bus before said first device responds to said read command.

4. The method of claim 3 further comprising:
   aborting execution of said read command by said first device upon said first device detecting said transferring said data over said SCSI bus by said second device.

5. A method comprising:
   designating a first device on an I/O bus as a primary target device for a RAID 1 read operation;
   designating a second device on said I/O bus as a mirror target device for said RAID 1 read operation; and
   snooping said I/O bus by said mirror target device to detect a read command directed to said primary target device.

6. The method of claim 5 further comprising:
   initiating execution of said read command by said mirror target device by starting to retrieve data specified in said read command upon detecting said read command directed to said primary target device.

7. The method of claim 6 further comprising:
   transferring said data over said I/O bus by said mirror target device only if said mirror target device has said data ready and can access said I/O bus before said primary target device responds to said read command.

8. The method of claim 7 further comprising:
   aborting execution of said read command by said primary target device upon said primary target device detecting said transferring said data over said I/O bus by said mirror target device.

9. The method of claim 7 further comprising:
   aborting, by an initiator, execution of said read command by said primary device following said transferring said data over said I/O bus by said mirror target device.

10. A method comprising:
    issuing, by an initiator, a single read command on a SCSI bus to implement a RAID 1 read transaction wherein said issuing, by said initiator, said single read command further comprises:
    issuing said single read command to a primary target device in a pair of target devices on said SCSI bus;
    snooping said SCSI bus by a mirror target device in said pair of target devices to detect said single read command; and
    issuing a single interrupt to a host system by said initiator to indicate completion of said RAID 1 read transaction.

11. The method of claim 10 further comprising:
    initiating execution of said single read command by said mirror target device by starting to retrieve data specified in said read command upon detecting said single read command.

12. The method of claim 11 further comprising:
    transferring said data over said SCSI bus by said mirror target device only if said mirror target device has said data ready and can access said SCSI bus before said primary target device responds to said single read command.

13. The method of claim 12 further comprising:
    aborting execution of said single read command by said primary target device upon said primary target device detecting said transferring said data over said SCSI bus by said mirror target device.

14. The method of claim 12 further comprising:
    aborting, by said initiator, execution of said single read command by said primary device following said transferring said data over said SCSI bus by said mirror target device.

* * * * *